No. 635,414. Patented Oct. 24, 1899.
R. S. ANDERSON.
BACK PEDALING BRAKE.
(Application filed May 20, 1897.)
(No Model.)
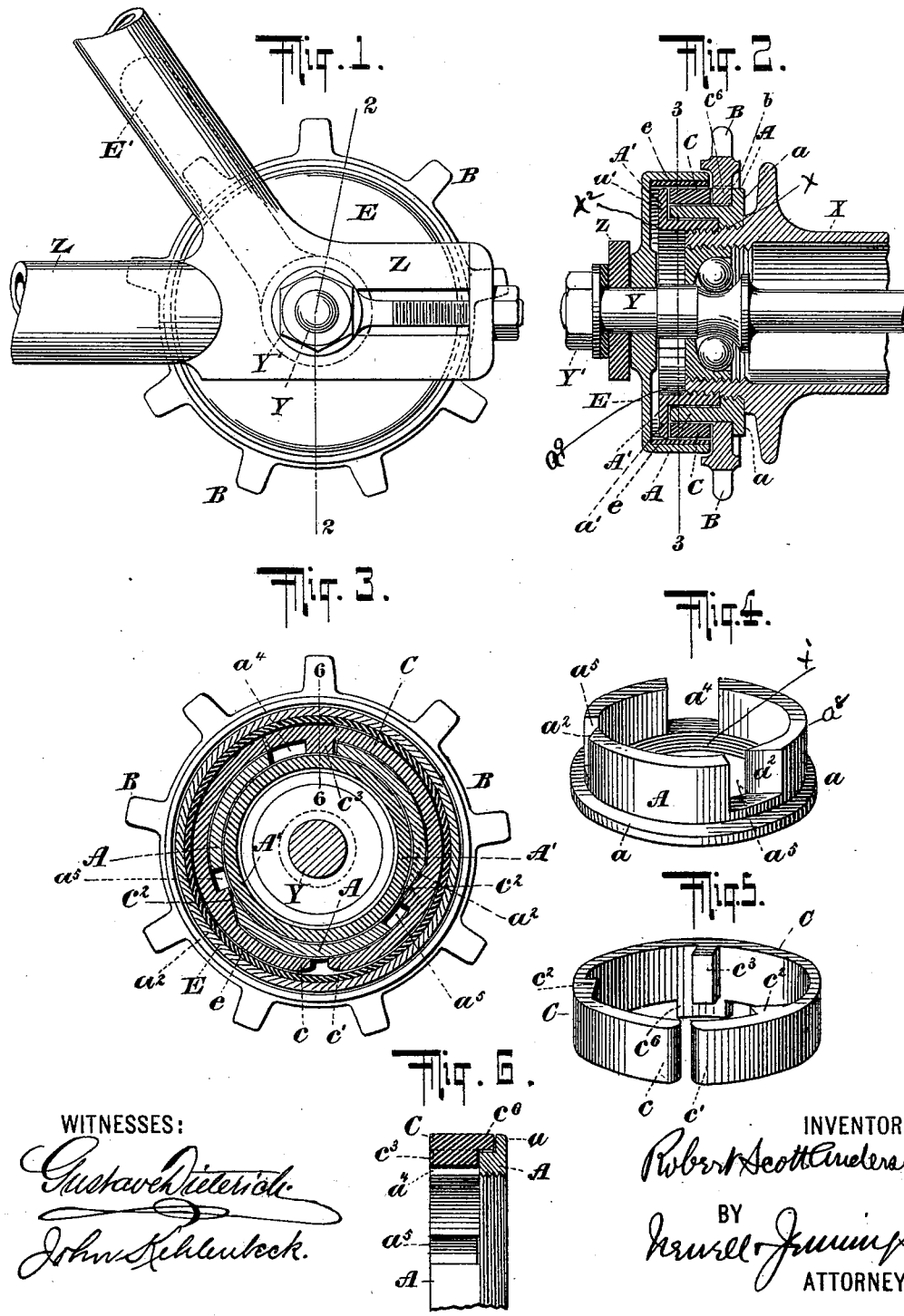
WITNESSES:
Gustave Dieterich
John Kehlenbeck.
INVENTOR
Robert Scott Anderson.
BY
Howell & Jennings
ATTORNEYS
THE NORRIS PETERS CO., PHOTO-LITHO., WASHINGTON, D. C.

UNITED STATES PATENT OFFICE.

ROBERT SCOTT ANDERSON, OF TORONTO, CANADA, ASSIGNOR TO THE NEW DEPARTURE BELL COMPANY, OF BRISTOL, CONNECTICUT.

BACK-PEDALING BRAKE.

SPECIFICATION forming part of Letters Patent No. 635,414, dated October 24, 1899.

Application filed May 20, 1897. Serial No. 637,314. (No model.)

*To all whom it may concern:*

Be it known that I, ROBERT SCOTT ANDERSON, a subject of Her Majesty the Queen of Great Britain and Ireland, residing at Toronto, in the county of York and Dominion of Canada, have invented certain new and useful Improvements in Brakes for Bicycles and other Vehicles; and I do hereby declare the following to be a full, clear, and exact description of the invention, such as will enable others skilled in the art to which it appertains to make and use the same.

The present invention relates to brakes for vehicles, and more particularly to a brake for bicycles and like vehicles; and its object is to produce a brake of simple construction and one which can be quickly operated and which shall positively and effectually retard the speed of the vehicle and be always under the control of the rider.

To the above end the present invention consists of the devices and combination of devices, which will be hereinafter described and claimed.

The present invention is illustrated in the accompanying drawings, in which—

Figure 1 shows a portion of the rear fork of a bicycle, with the brake applied to the rear wheel. Fig. 2 is a sectional view on the line 2 2 of Fig. 1. Fig. 3 is a sectional view on the line 3 3 of Fig. 2. Fig. 4 is a detail view of the brake-actuating sleeve. Fig. 5 is a detail view of the movable brake member, and Fig. 6 is a detail sectional view on the line 6 6 of Fig. 3.

Similar letters of reference represent corresponding parts throughout the several views.

In the drawings, X represents the hub of a bicycle-wheel, which is mounted to revolve upon the axle Y, the axle Y being mounted in bearings in the rear fork Z of the bicycle-frame and held therein by the usual nut Y', tapped on the end of the axle Y.

The brake mechanism comprises a movable brake member C, shown as a split or divided elastic ring, and a fixed brake member, shown as a brake-drum E, which surrounds the elastic brake-ring C and with which said elastic brake-ring is adapted to engage when expanded, as will be hereinafter described.

In practice the elastic brake-ring C is preferably mounted upon the hub X of the rear bicycle-wheel and is arranged to be expanded by a relative rotary movement of said elastic brake-ring and hub by means of complementary inclined contact-faces on said ring and hub, as will be explained.

The elastic brake-ring C is shown in detail in Fig. 5, and consists of a split or divided ring of steel or any suitable metal, the ends $c$ and $c'$ being preferably rounded off at the outer edges, as shown, for a purpose to be explained.

Upon the inner face of the elastic brake-ring C, preferably at a point diametrically opposite the opening between the ends $c$ and $c'$, is formed or secured a lug $c^3$, having the plane of its forward or right side as it appears in the drawings substantially radial to the inner face of the elastic brake-ring C. The elastic brake-ring C also carries upon its inner circumference a plurality of lugs or projections $c^2$, (in the example shown in the drawings two such lugs being employed and placed each side of the central projection $c^3$ and nearer the ends than the center, the forward planes of which are inclined or beveled,) which lugs are arranged to act with complementary inclined contact-faces carried upon the hub X, whereby said elastic brake-ring will be expanded, as will be explained.

The elastic brake-ring C is mounted loosely upon the hub X or upon a sleeve A, which is threaded at X' and engages a threaded portion $x$ of said hub X. The sleeve A has a vertical flange $a$ and a horizontal flange $a^3$, which is cut out at $a^4$ and $a^5$, the opening $a^4$ being somewhat longer than the width of the projection $c^3$ on the elastic brake-ring C and having the plane of its forward edge substantially radial, and the planes of the forward edges $a^2$ of the openings $a^5$ are inclined, so that when the elastic brake-ring C is in place upon the sleeve A the lug $c^3$ will be received in the opening $a^4$ and the lugs $c^2$ will fit the openings $a^5$, with the inclined complementary contact-faces in contact, as shown in Fig. 3, so arranged that the elastic brake-ring and the sleeve A, carried by the hub X, may have a slight limited relative rotation controlled by the extent of movement of the lug $c^3$ in the slot $a^4$, whereby the inclined contact-faces on the hub and elastic brake-ring will act to expand the ring and cause it to engage the fixed brake member, as will be described.

It is obvious that the slot $a^4$ and the inclines $a^2$ could be formed directly upon the hub X; but for convenience and to enable the brake mechanism to be applied to bicycles already built I prefer to make them on a sleeve A, to be secured to the hub as shown.

The above-described arrangement is such that so long as the hub and brake-ring revolve together in the position shown in Fig. 3 at substantially the same angular velocity the elastic brake-ring will remain contracted and will not engage the fixed brake member; but if the elastic brake-ring be held and its rotation retarded the relative rotation of the hub and elastic brake-ring which would then occur would cause the complementary inclined contact-faces on the hub and elastic brake-ring to have a relative movement toward each other, causing the elastic brake-ring to expand and engage the fixed brake member.

Any suitable means may be provided for retarding the elastic brake-ring C or for causing a relative rotation between the hub and ring; but I prefer to arrange the mechanism in such manner that the brake shall be controlled by the driving mechanism of the bicycle, which may be of the following form and arrangement.

B represents the wheel-driving element, which in the device of the drawings is represented as a sprocket-wheel having a web $b$ and the radially-projecting teeth, with which the usual chain engages to impart motion to the hub and wheel, said chain being driven from a crank-shaft and cranks, as usual in safety-bicycles.

The sprocket-wheel B is loosely mounted upon the sleeve A, so that it is free to have a limited backward-and-forward movement thereon, and in a recess formed in the web $b$ of the sprocket-wheel B (see dotted lines, Fig. 2) engages a lug or projection $c^6$, formed upon the elastic brake-ring C, forming a connection between the brake-ring and sprocket-wheel, the arrangement being such that a forward rotation of the sprocket-wheel B will by means of the lug $c^6$ move forward the elastic brake-ring C, which by means of its lug $c^3$ engaging the recess $a^4$, or the forward edge thereof, will impart a rotation to the hub and wheel, the parts being in the position shown in Fig. 3; but a retardation of the sprocket-wheel B, which would be produced by the act of "back-pedaling," will tend to retard the elastic brake-ring C, and the hub and wheel moving forward under the impetus which has been imparted thereto by the rider will cause a relative movement of rotation between the elastic brake-ring and hub and cause the inclined faces $a^2$ to engage the faces on the lugs $c^2$, thus expanding the brake-ring C and causing it to engage the fixed brake member, as will be described.

A' indicates a sleeve having a projecting flange $a'$ and interiorly threaded, as at $a^9$, in a direction opposite to the threads on the sleeve A and which engages a threaded projection $x^2$ of the hub X, forming a lock for the sleeve A and acting to retain the elastic brake-ring C in proper position.

The elastic brake-ring C when expanded as described is forced into contact with a fixed brake member, shown as a brake-drum E, which surrounds the elastic brake-ring C, the brake-drum E being secured rigidly to a fixed portion of the bicycle-frame concentric to the brake-ring C and preferably having an arm E' projecting therefrom which is fixed to the inner surface of the frame Z in order to strengthen the brake-drum E and enable it to withstand the great strain which is put upon it when the brake-ring is forced to contact therewith.

Upon the inner face of the brake-drum E is secured a lining $e$ of leather or other suitable material, whereby to increase the frictional contact of the elastic brake-ring C therewith, and, as before explained, the ends $c$ and $c'$ of the brake-ring C are rounded off in order that the lining $e$ may not be damaged or injured as the brake-ring engages therewith.

The operation of my invention is as follows: The parts being in position shown in the drawings, a rotation of the sprocket-wheel B in a forward direction by means of the usual chain passing around the same and driven by a sprocket-wheel on a crank or pedal shaft, as is usual in safety-bicycles, will by means of its connection with the brake-ring C and the engagement of the forward side of the lug $c^3$ with the forward edge of the slot $a^4$ on the sleeve A impart a rotation to the hub and wheel and propel the bicycle in a forward direction, the brake-ring and hub partaking of a forward rotation at the same angular velocity and the parts being in the position shown in Fig. 3, the brake-ring revolving freely within the fixed brake-drum.

When the rider desires to retard or stop the motion of the bicycle, he naturally performs the act of "back-pedaling," as it is termed, which consists of applying a force through the pedals and chain which will induce a backward motion to the sprocket-wheel relatively to the motion of the wheel itself, which will be compelled by its inertia to continue the forward motion. This will retard the forward motion of the sprocket-wheel B and the elastic brake-ring C, which is connected thereto, and which are loosely mounted upon the sleeve A and move the inclines $a^2$, which are carried by the hub, forward relatively to the inclined faces of the lugs $c^2$ on the elastic brake-ring, causing said ring to expand and engage the inner circumference of the brake-drum E, thus "braking" or stopping the forward motion of the bicycle.

I claim—

1. In a bicycle, the combination with the hub of a wheel thereof, of a wheel-driving element loosely mounted thereon and capable of limited rotation thereupon, a loose brake member consisting of a split brake-ring mounted upon and fitted to said hub, an inwardly-projecting arm upon the ring and a slot or opening in the hub within which said arm may have motion, a laterally-projecting lug upon said split brake-ring fitting into an orifice in the wheel-driving element, said split brake-ring and hub being provided with complementary inclined faces, and a fixed brake member concentric with and surrounding said split brake-ring and attached rigidly to the frame of the bicycle, so that upon a forward propulsion of the bicycle the inwardly-projecting lug of the spring will engage the hub and through the connection of the same with the wheel-driving element cause the hub and wheel to rotate, and upon a backward pressure upon the propelling power the ring will be forced through its connection with the wheel-driving element to expand by the action of the inclined surfaces and engage the fixed brake member and so brake the wheel, substantially as described.

2. In a bicycle-brake, the combination with a wheel-hub, of a bed or support secured to said hub, a wheel-driving element loosely mounted thereon and capable of limited rotation thereupon, a loose brake member consisting of a split brake-ring mounted upon, and fitted to, said bed or support, an inwardly-projecting arm upon said ring and a slot or opening in said support within which said arm may have motion, a laterally-projecting lug upon said split brake-ring fitting into an orifice in the wheel-driving element, said split brake-ring and bed or support being provided with complementary inclined faces, and a fixed brake member concentric with, and surrounding, said split brake-ring and attached rigidly to the frame of the bicycle, so that, upon a forward propulsion of the bicycle, the inwardly-projecting lug of the ring will engage said support and through the connection of the same with the wheel-driving element cause the hub and axle to rotate, and upon a backward pressure upon the propelling power the ring will be caused through its connection with the wheel-driving element to expand by the action of the inclined surfaces and engage the fixed brake member and so brake the wheel, substantially as described.

In testimony whereof I have signed this specification in the presence of two subscribing witnesses.

ROBERT SCOTT ANDERSON.

Witnesses:
EDITH LACKIE,
JAMES ROSS.